(12) United States Patent
Bolash et al.

(10) Patent No.: US 7,049,620 B2
(45) Date of Patent: May 23, 2006

(54) MEDIA TYPE SENSING METHOD FOR AN IMAGING APPARATUS

(75) Inventors: John Philip Bolash, Lexington, KY (US); Mahesan Chelvayohan, Lexington, KY (US); Patrick Laurence Kroger, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 11/098,702

(22) Filed: Apr. 5, 2005

(65) Prior Publication Data

US 2005/0201223 A1 Sep. 15, 2005

Related U.S. Application Data

(62) Division of application No. 10/342,786, filed on Jan. 15, 2003, now Pat. No. 6,900,449.

(51) Int. Cl.
*G01N 21/86* (2006.01)
*G01V 8/00* (2006.01)
*B41J 29/393* (2006.01)

(52) U.S. Cl. .......................... 250/559.16; 250/559.18; 347/19

(58) Field of Classification Search ............ 250/ 559.16–559.18; 356/445, 446, 448; 347/14, 347/16, 19, 105, 106; 101/484; 400/708, 400/624–633.2; 399/45, 389; 271/258.01, 271/265.01
See application file for complete search history.

(56) References Cited

U.S. PATENT DOCUMENTS

| | | | |
|---|---|---|---|
| 4,066,969 A | 1/1978 | Pearce et al. | 328/5 |
| 4,092,068 A | 5/1978 | Lucas et al. | 356/73 |
| 4,352,988 A | 10/1982 | Ishida | 250/559 |
| 4,525,630 A | 6/1985 | Chapman | 250/572 |
| 4,540,887 A | 9/1985 | Minerd et al. | 250/561 |
| 4,545,031 A | 10/1985 | Kobayashi | 364/900 |
| 4,578,770 A | 3/1986 | Mitani | 364/571 |
| 4,642,456 A | 2/1987 | Watanabe | 250/223 |
| 4,642,457 A | 2/1987 | Watanabe | 250/223 |
| 4,673,818 A | 6/1987 | Guerra | 250/571 |
| 4,929,844 A | 5/1990 | Houjiyou et al. | 250/561 |
| 4,945,253 A | 7/1990 | Frohardt | 250/571 |
| 4,954,846 A | 9/1990 | Matsuo et al. | 399/51 |
| 4,958,069 A | 9/1990 | Okamori | 250/223 |
| 4,963,731 A | 10/1990 | King | 250/560 |
| 4,970,544 A | 11/1990 | Furusawa et al. | 355/24 |
| 4,985,636 A | 1/1991 | Fukui et al. | 250/559 |
| 4,989,985 A | 2/1991 | Hubble, III et al. | 356/445 |
| 5,046,851 A | 9/1991 | Morgan | 356/375 |
| 5,084,627 A | 1/1992 | Ueki et al. | 250/561 |
| 5,225,688 A | 7/1993 | Endo | 250/560 |
| 5,250,813 A | 10/1993 | Takahashi et al. | 250/561 |
| 5,262,637 A | 11/1993 | Cumberledge et al. | 250/223 |

(Continued)

FOREIGN PATENT DOCUMENTS

EP 1034937 A2 9/2000

(Continued)

*Primary Examiner*—Stephone B. Allen
*Assistant Examiner*—Suezu Ellis
(74) *Attorney, Agent, or Firm*—Taylor & Aust, P.C.

(57) ABSTRACT

A method of correcting for sensitivity variation of media sensors includes determining a first signal level corresponding to a first calibration media having a first glossiness; determining a second signal level corresponding to a second calibration media having a second glossiness, the second glossiness being greater than the first glossiness; and determining a corrected normalized signal level ratio of an unknown media based on the first signal level of the first calibration media and the second signal level of the second calibration media.

5 Claims, 8 Drawing Sheets

U.S. PATENT DOCUMENTS

| | | | |
|---|---|---|---|
| 5,574,527 A | 11/1996 | Folkins | 399/9 |
| 5,585,645 A | 12/1996 | Goto | 250/559.12 |
| 5,666,194 A | 9/1997 | Denton | 356/72 |
| 5,689,757 A | 11/1997 | Ferrante et al. | 399/45 |
| 5,751,443 A | 5/1998 | Borton et al. | 356/446 |
| 5,751,854 A | 5/1998 | Saitoh et al. | 382/218 |
| 5,808,296 A | 9/1998 | McMonagle et al. | 250/221 |
| 5,811,777 A | 9/1998 | Ackley | 235/462 |
| 5,856,833 A | 1/1999 | Elgee et al. | 347/19 |
| 5,875,029 A | 2/1999 | Jann et al. | 356/345 |
| 5,925,889 A | 7/1999 | Guillory et al. | 250/559 |
| 6,006,668 A | 12/1999 | Rehmann | 101/484 |
| 6,019,449 A | 2/2000 | Bullock et al. | 347/14 |
| 6,031,620 A | 2/2000 | Typpo | 356/445 |
| 6,088,546 A | 7/2000 | Inoue et al. | 399/45 |
| 6,122,042 A | 9/2000 | Wunderman et al. | 356/73 |
| 6,201,255 B1 | 3/2001 | Torchalski et al. | 250/559.4 |
| 6,215,552 B1 | 4/2001 | Acquaviva et al. | 356/371 |
| 6,217,168 B1 | 4/2001 | Elgee | 347/105 |
| 6,233,053 B1 | 5/2001 | Preston et al. | 356/445 |
| 6,242,733 B1 | 6/2001 | Ma et al. | 250/223 |
| 6,255,665 B1 | 7/2001 | Elgee et al. | 250/559.4 |
| 6,291,829 B1 | 9/2001 | Allen et al. | 250/559.07 |
| 6,325,505 B1 | 12/2001 | Walker | 347/105 |
| 6,348,697 B1 | 2/2002 | Kitajima | 250/559.4 |
| 6,397,671 B1 | 6/2002 | Nishio et al. | 73/159 |
| 6,400,912 B1 | 6/2002 | Tanaka et al. | 399/45 |
| 6,425,650 B1 | 7/2002 | Walker et al. | 347/14 |
| 6,713,775 B1 * | 3/2004 | Chelvayohan et al. | 250/559.16 |
| 2001/0005340 A1 | 6/2001 | Nishikawa | 369/47.5 |
| 2001/0008275 A1 | 7/2001 | Yanagiuchi | 250/559.4 |
| 2001/0026293 A1 | 10/2001 | Kaneko | 347/14 |
| 2002/0005497 A1 | 1/2002 | Sano | 250/559.11 |
| 2002/0071688 A1 | 6/2002 | Maruyama | 399/45 |

FOREIGN PATENT DOCUMENTS

| | | |
|---|---|---|
| GB | 2120382 A | 11/1983 |
| WO | WO 01/32425 A1 | 5/1921 |
| WO | WO 01/32426 A1 | 5/2001 |
| WO | WO 01/58694 A1 | 8/2001 |

* cited by examiner

MEDIA TYPE SENSING METHOD FOR AN IMAGING APPARATUS

This is a divisional of application No. 10/342,786 filed Jan. 15, 2003 now U.S. Pat. No 6,900,449.

BACKGROUND OF THE INVENTION

1. Field of the Invention

The present invention relates to an imaging apparatus, and, more particularly, to a method of media type sensing for an imaging apparatus.

2. Description of the Related Art

Media sensors are used to detect the presence or absence of print media, and in some cases, are also used to determine the print media type. One form of a media sensor includes a single light source, such as a light emitting diode (LED), and a light detector, such as a phototransistor. Typically, the light detector is located on the same side of a print media as the light source. During operation, the LED directs light at a predefined angle onto a material surface of the print media, and the surface characteristics of the print media are examined in terms of the amount of light reflected from the surface that is received by the light detector. For example, the presence of the print media is detected based upon a predetermined amount of light reflected from the media to the light detector.

One known sensor is a photo sensor that responds to a first reference spectral reflection from a reference surface at an angle of reflection equal to the angle of incidence. When a sheet of media is registered by the printer against the reference surface, the photo sensor responds to a second spectral reflection from the sheet of media. The ratio of the second spectral reflection intensity to first spectral reflection intensity is compared to a selected threshold to identify the media by gloss level.

It is further known to have a detection system in which external light is detected during a non-emission state of a light emitting element and is used to correct a reference value. The corrected reference value is then compared to a detected value of light emitted from the light emitting element and reflecting from an original to be copied, and based on the comparison a determination is made as to the presence of an original.

Some media sensors include a pair of light detectors, one of the light detectors being positioned to sense reflected diffuse light and a second detector positioned to sense reflected specular light. Such a sensor may be used, for example, to detect and distinguish between various media types by optically measuring the glossiness of the media based on each of reflected specular light and reflected diffusely scattered light. To measure the glossiness, a collimated beam of light is directed towards the media and a reflectance ratio (R) of the detected reflected specular light intensity and the detected diffusively scattered light intensity is calculated. The media sensor is initially calibrated by measuring a reflectance ratio (R0) on a known gloss media. A normalized reflectance ratio (Rn) is calculated using the formula: Rn=(R/R0). Normalized reflectance ratio Rn then is used to identify the media type of an unknown media by a comparison of the normalized reflectance ratio Rn to a plurality of normalized reflectance ratio Rn ranges, each range being associated with a particular type of media.

What is needed in the art is an improved media sensing system and method that can use a simple single detector sensor using low cost digital electronics, and which reliably distinguishes between various media types.

SUMMARY OF THE INVENTION

The present invention relates to an improved media sensing system and method that can use a simple single detector sensor using low cost digital electronics, and which reliably distinguishes between various media types.

The present invention, in one form thereof, is directed to a media type sensing method for an imaging apparatus. The method includes the steps of providing a sensor including a light source and a light detector; driving the light source based on a drive signal, the light source generating a light beam that impinges a print media sheet thereby generating reflected light, the reflected light having a light intensity related to the drive signal and related to a type of the print media sheet; detecting the light intensity of the reflected light with the light detector, the light detector generating a detection voltage based on the light intensity; providing a comparator to compare a reference voltage to the detection voltage, wherein the comparator has an output change from an initial output state to a media type detection state when the detection voltage transitions across the reference voltage; changing the light intensity of the light source by changing the drive signal, while monitoring for the output change of the comparator; determining a drive signal value of the drive signal at a point of detection of the output change; and correlating the drive signal value to a specific media type.

In another form thereof, the present invention is directed to a method of correcting for sensitivity variation of media sensors. The method includes the steps of determining a first signal level corresponding to a first calibration media having a first glossiness; determining a second signal level corresponding to a second calibration media having a second glossiness, the second glossiness being greater than the first glossiness; and determining a corrected normalized signal level ratio of an unknown media based on the first signal level of the first calibration media and the second signal level of the second calibration media.

In yet another form thereof, the present invention is directed to a method of correcting for sensitivity variation of media sensors, including the steps of determining a first duty cycle corresponding to a first calibration media having a first glossiness; determining a second duty cycle corresponding to a second calibration media having a second glossiness, the second glossiness being greater than the first glossiness; and determining a corrected normalized duty cycle ratio of an unknown media based on the first duty cycle of the first calibration media and the second duty cycle of the second calibration media.

In yet another form thereof, the present invention is directed to a method of media type detection, including the steps of providing a first signal source generating a first pulse width modulated signal having a duty cycle DS; providing a second signal source generating a second pulse width modulated signal having a duty cycle DR; converting the first pulse width modulated signal to an output signal having a voltage level related to the duty cycle DS; converting the second pulse width modulated signal to a reference voltage related to the duty cycle DR; providing a sensor including a light source and a light detector; driving the light source based on the output signal, the light source generating a light beam that impinges a print media sheet thereby generating reflected light, the reflected light having a light intensity related to the voltage level and related to a type of the print media sheet; detecting the light intensity of the reflected light with the light detector, the light detector generating a detection voltage based on the light intensity;

providing a comparator to compare the reference voltage to the detection voltage, wherein the comparator has an output change from an initial output state to a media type detection state when the detection voltage transitions across the reference voltage; changing the light intensity of the light source by changing the duty cycle DS of the first pulse width modulated signal, while monitoring for the output change of the comparator, wherein if after completing the step of changing the duty cycle DS the comparator has not experienced the output change, then changing the reference voltage by changing the duty cycle DR of the second pulse width modulated signal, and then repeating the step of changing the duty cycle DS; determining a duty cycle value corresponding to the first pulse width modulated signal at a point of detection of the output change; and correlating the duty cycle value to a specific media type.

In still another form thereof, the present invention is directed to an apparatus for media type detection. The apparatus includes a signal source that generates a first pulse width modulated signal having a duty cycle. A first filter circuit is electrically coupled to the signal source for converting the first pulse width modulated signal to an output signal having a voltage level related to the duty cycle. A sensor includes a light source and a light detector. The light source is coupled to the first filter for receiving the output signal. The light source generates a light beam that impinges a print media sheet thereby generating reflected light. The reflected light has a light intensity related to the voltage level and related to a type of the print media sheet. The light detector detects the light intensity of the reflected and generates a detection voltage based on the light intensity. A voltage reference source supplies a reference voltage. A comparator has a first input port coupled to the voltage reference source and has a second input port coupled to the light detector to compare the reference voltage to the detection voltage. The comparator has an output change from an initial output state to a media type detection state when the detection voltage transitions across the reference voltage. A controller controls the signal source to change the light intensity of the light source by changing the duty cycle of the first pulse width modulated signal. The controller is coupled to the output of the comparator to monitor for the output change of the comparator. The controller determines a duty cycle value (D) at a point of detection of the output change and correlates the duty cycle value (D) to a specific media type.

In still another form thereof, the present invention is directed to an imaging apparatus configured for media sensing. The imaging apparatus includes a media sensor including a light source and a light detector. A first signal source supplies a first pulse width modulated signal. A first low pass filter circuit is coupled between the first signal source and the light source. A comparator has a signal input port, a reference input port and an output. The light detector is coupled to the signal input port of the comparator. A second signal source supplies a second pulse width modulated signal. A second low pass filter circuit is coupled between the second signal source and the reference input port of the comparator. A controller is coupled to the output of the comparator.

An advantage of the present invention is that it can use a simple single detector sensor using low cost digital electronics.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
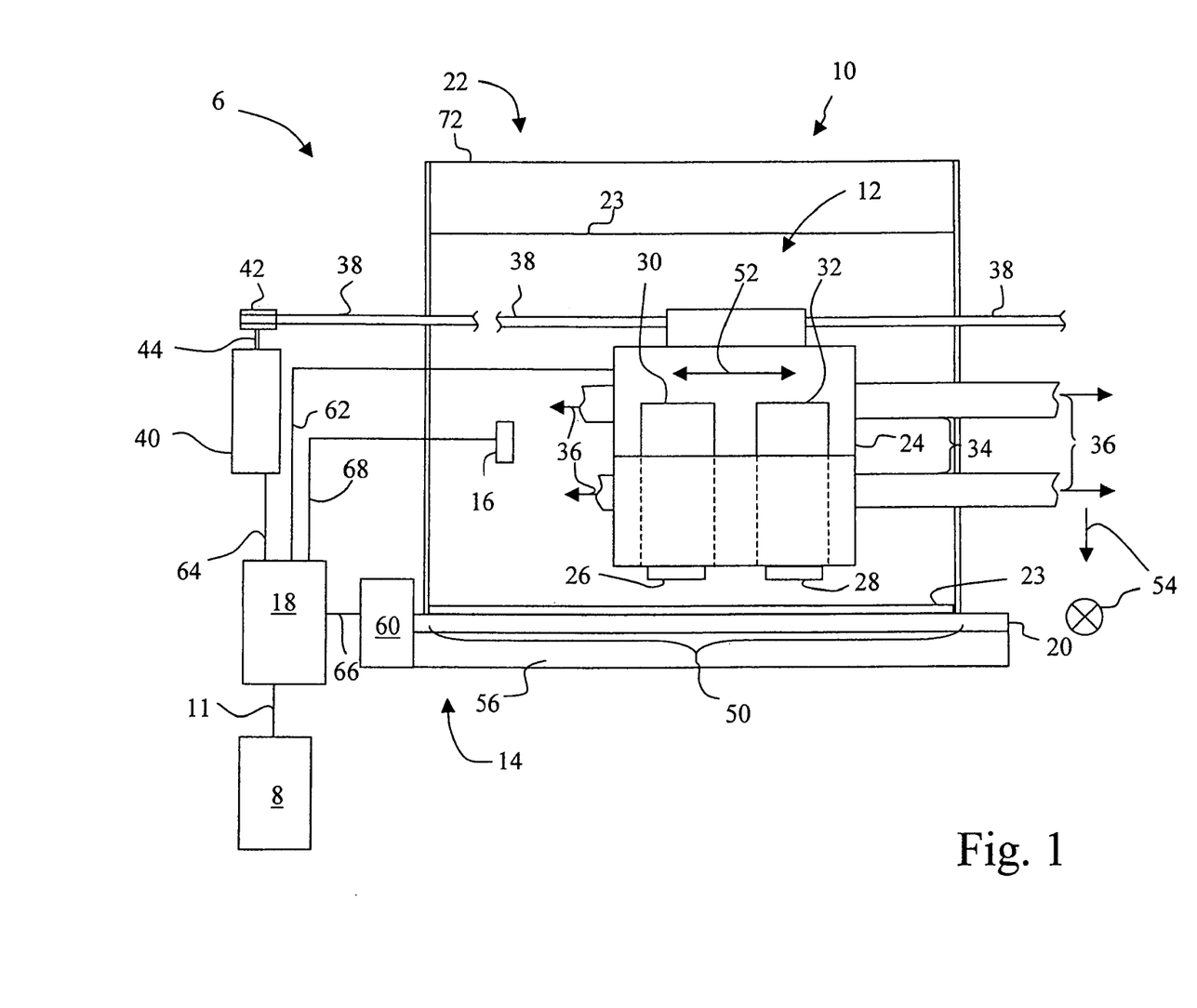
FIG. 1 is a diagrammatic representation of an imaging system including an imaging apparatus embodying the present invention.
Figure 2:
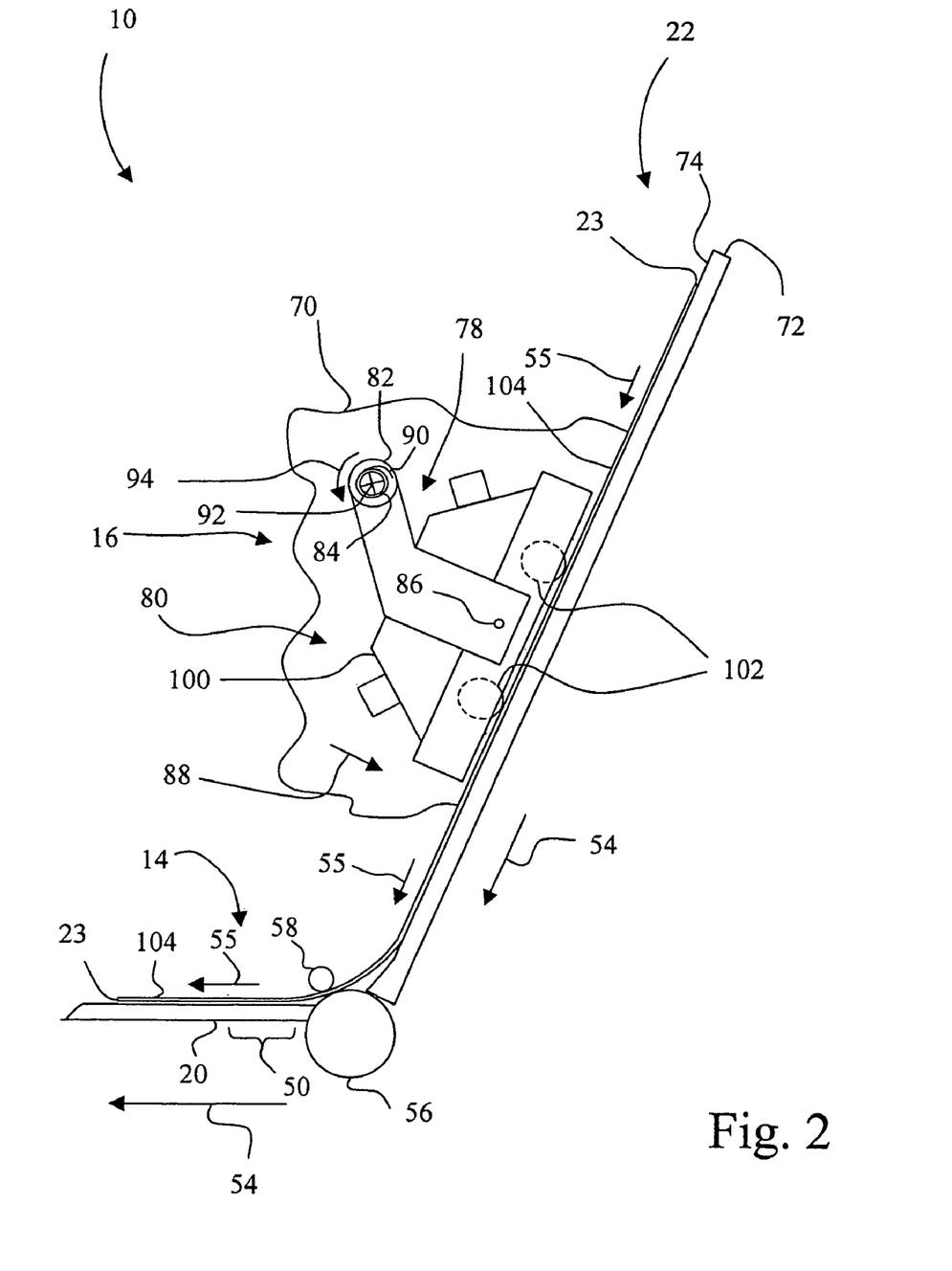
FIG. 2 is a side diagrammatic representation of a portion of the imaging apparatus depicted in FIG. 1.

Referring now to the drawings, and particularly to FIGS. 1 and 2, there is shown an imaging system 6 embodying the present invention. Imaging system 6 includes a computer 8 and an imaging apparatus in the form of an ink jet printer 10. Computer 8 is communicatively coupled to ink jet printer 10 via a communications link 11. Communications link 11 may be, for example, a direct electrical or optical connection, or a network connection.

Computer 8 is typical of that known in the art, and includes a display, an input device, e.g., a keyboard, a processor, and associated memory. Resident in the memory of computer 8 is printer driver software. The printer driver software places print data and print commands in a format that can be recognized by ink jet printer 10. The format can be, for example, a data packet including print data and printing commands for a given area, such as a print swath, and including a print header that identifies the swath data.

Ink jet printer 10 includes a printhead carrier system 12, a feed roller unit 14, a media sensor assembly 16, a controller 18, a mid-frame 20 and a media source 22.

Media source 22, such as a paper tray, is configured and located to supply individual print media sheets 23 to feed roller unit 14, which in turn further transports the print media sheets 23 during a printing operation.

Printhead carrier system 12 includes a printhead carrier 24 for carrying a color printhead 26 and a black printhead 28. A color ink reservoir 30 is provided in fluid communication with color printhead 26, and a black ink reservoir 32 is provided in fluid communication with black printhead 28. Printhead carrier system 12 and printheads 26, 28 may be configured for unidirectional printing or bi-directional printing.

Printhead carrier 24 is guided by a pair of guide members 34. Each of guide members 34 may be, for example, a guide rod or a guide rail. The axes 36 of guide members 34 define a bi-directional scanning path 36 for printhead carrier 24.

Printhead carrier 24 is connected to a carrier transport belt 38 that is driven by a carrier motor 40 via a carrier pulley 42. Carrier motor 40 has a rotating carrier motor shaft 44 that is attached to carrier pulley 42. At the directive of controller 18, printhead carrier 24 is transported in a reciprocating manner along guide members 34. Carrier motor 40 can be, for example, a direct current (DC) motor or a stepper motor.

The reciprocation of printhead carrier 24 transports ink jet printheads 26, 28 across the print media sheet 23, such as paper, along bi-directional scanning path 36 to define a two-dimensional, e.g., rectangular, print zone 50 of printer 10. This reciprocation occurs in a main scan direction 52. The print media sheet 23 is transported in a sheet feed direction 54. In the orientation of FIG. 1, the sheet feed direction 54 is shown as flowing down media source 22, and toward the reader (represented by an X) along mid-frame 20. Main scan direction 52, which is commonly referred to as the horizontal direction, is parallel with bi-directional scanning path 36 and is substantially perpendicular to sheet feed direction 54, which is commonly referred to as the vertical direction. During each scan of printhead carrier 24, the print media sheet 23 is held stationary by feed roller unit 14.

Referring also to FIG. 2, feed roller unit 14 includes a feed roller 56 and corresponding pinch rollers 58. Feed roller 56 is driven by a drive unit 60 (FIG. 1). Feed pinch rollers 58 apply a biasing force to hold the print media sheet 23 in contact with respective driven feed roller 56. Drive unit 60 includes a drive source, such as a stepper motor, and an associated drive mechanism, such as a gear train or belt/pulley arrangement. Feed roller unit 14 feeds the print media sheet 23 along a print media path 55 in a sheet feed direction 54 (see FIGS. 1 and 2).

Controller 18 is electrically connected to printheads 26 and 28 via a printhead interface cable 62. Controller 18 is electrically connected to carrier motor 40 via an interface cable 64. Controller 18 is electrically connected to drive unit 60 via an interface cable 66. Controller 18 is electrically connected to media sensor assembly 16 via an interface cable 68.

Controller 18 includes a microprocessor having an associated random access memory (RAM) and read only memory (ROM). Controller 18 executes program instructions to effect the printing of an image on the print media sheet 23, which can be one or more media types, such as coated paper, plain paper, photo paper and transparency. In addition, controller 18 executes instructions to conduct media sensing, such as detecting the presence or absence of the print media sheet 23, or the determination of media type, based on information received from media sensor assembly 16.

It is contemplated that media sensor assembly 16 may be positioned at any position along print media path 55. For example, media sensor assembly 16 may be connected to printhead carrier 24 for reciprocation across the print media sheet 23 along bi-directional scanning path 36 in print zone 50. As another example, print media sensor assembly 16 may be located along print media path 55 near media source 22, as in the arrangement of FIG. 2.

FIG. 2 includes a broken out section that is enlarged in relation to the other components of FIG. 2 to more clearly show the components of media sensor assembly 16. Media sensor assembly 16 is rotatably coupled to a frame 70 of ink jet printer 10. Also, media source 22 is attached, at least in part, to frame 70. Media source 22 includes a media support 72 including a media support surface 74. In the embodiment shown in FIG. 2, media sensor assembly 16 is located upstream of print zone 50, and more particularly, adjacent to media source 22.

Media sensor assembly 16 includes a mounting device 78 and a media sensor 80. Media sensor assembly 16 is coupled to frame 70 via mounting device 78. Mounting device 78 includes a pivot arm 82 that is pivotably attached to frame 70 via a pivot rod 84, and is pivotably attached to media sensor 80 via pivot pins 86. A spring 90 provides a biasing force to pivot media sensor assembly 16 about an axis 92 in the direction indicated by arrow 94. In an alternative arrangement, sensor assembly 16 may be biased simply by the forces of gravity. Thus, mounting device 78 is configured to facilitate movement of media sensor 80 in a direction 88 toward print media path 55, and more particularly, toward media support 72, and to restrain movement of media sensor 80 in sheet feed direction 54.

Media sensor assembly 16 includes a body 100 for supporting media sensor 80, and may include at least one rotating member 102, such as for example, one or more wheels. Media sensor 80 is positioned by mounting device 78 such that each rotating member 102 rotates due to contact with a surface 104 of print media sheet 23 as print media sheet 23 moves relative to media sensor 80 in sheet feed direction 54 along print media path 55.

Contained within media sensor 80 of media sensor assembly 16 are the electrical sensory components, such as for example, a light source, a specular detector and/or a diffuse detector, the configuration and operation of which is known in the art. In its simplest form, the light source may include, for example, a light emitting diode (LED). In a more complex form, the light source may further include additional optical components for generating a collimated light beam. Each of the specular detector and/or the diffuse detector can be, for example, a phototransistor. Advantageously, the present invention can use either a simple single detector sensor having only a specular detector, or a multiple detector sensor having both a specular detector and a diffuse detector.

Figure 3:
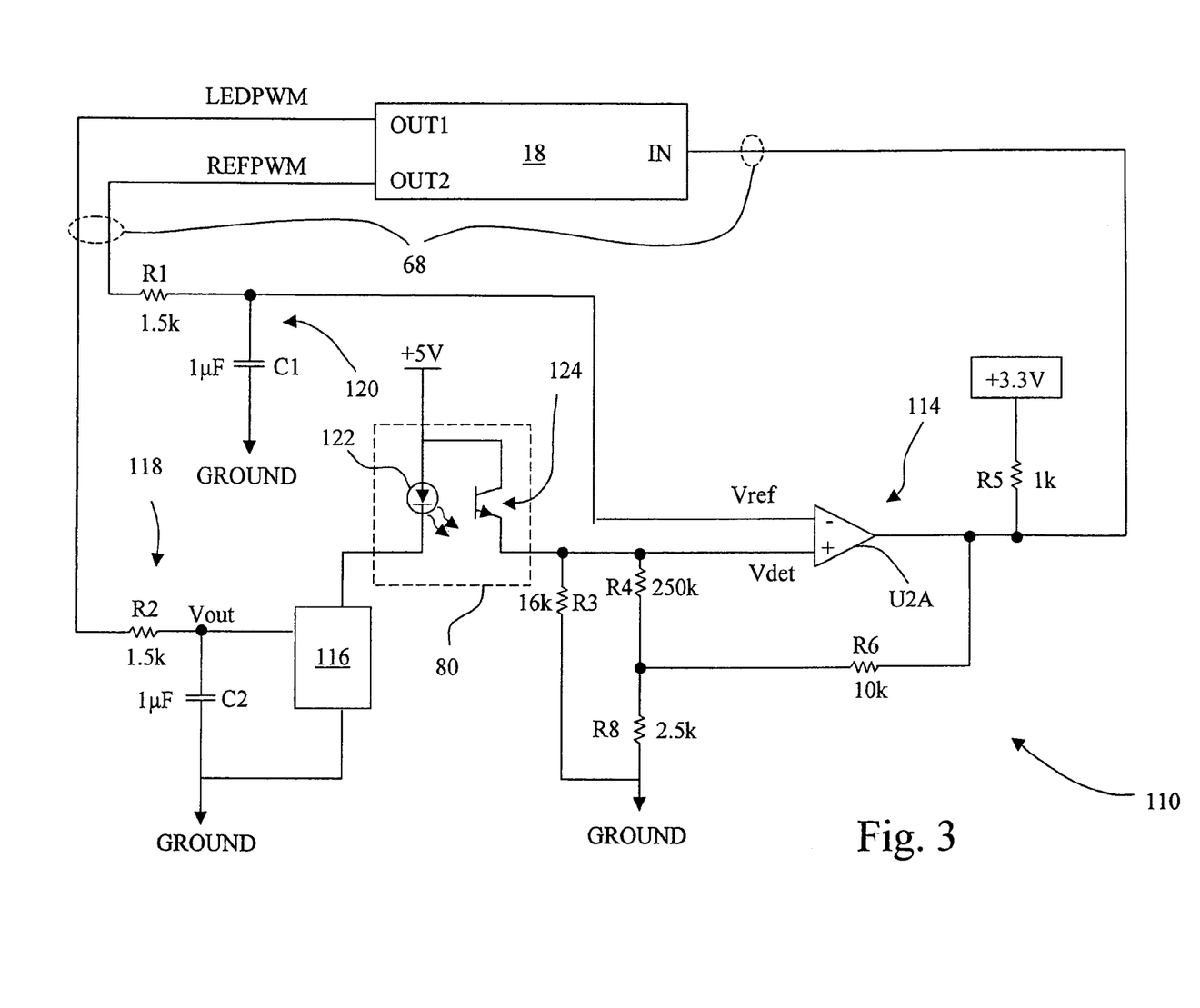
FIG. 3 is circuit diagram showing an electrical circuit including components configured for implementing the present invention.

FIG. 3 is circuit diagram showing an electrical circuit 110 electrically coupled to controller 18 via interface cable 68. Electrical circuit 110 includes media sensor 80, a comparator circuit 114, a media sensor drive circuit 116, a first low pass filter circuit 118 and a second low pass filter circuit 120.

Media sensor 80 includes a light source 122 and a specular (light) detector 124. In this embodiment, light source 122 is in the form of a light emitting diode (LED) and specular (light) detector 124 is in the form of a phototransistor. As is known in the art.

Comparator circuit 114 includes a comparator U2A and its loading resistors R3, R4, R8; positive feedback resistor R6; and pull-up resistor R5.

Media sensor drive circuit 116 may include a transistor and a load resistor.

First low pass filter circuit 118 includes resistor R2 and capacitor C2.

Second low pass filter circuit 120 includes resistor R1 and capacitor C1.

In the arrangement of electrical circuit 110, first low pass filter circuit 118 is coupled between the LEDPWM output port OUT1 of controller 18 and media sensor drive circuit 116. Media sensor drive circuit 116 is series coupled to light source 122 of media sensor 80. Light detector 124 of media sensor 80 is coupled to the non-inverting input port (+) of comparator U2A. Second low pass filter circuit 120 is coupled between the REFPWM output port OUT2 of controller 18 and the inverting input port (−) of comparator U2A. The output of comparator U2A is coupled to an input port IN of controller 18. While for convenience each of the signal sources supplying pulse width modulated signals LEDPWM and REFPWM are shown as being part of controller 18, it is to be recognized that one or both of the signal sources supplying pulse width modulated signals LEDPWM and REFPWM may be formed external to controller 18.

Figure 4:
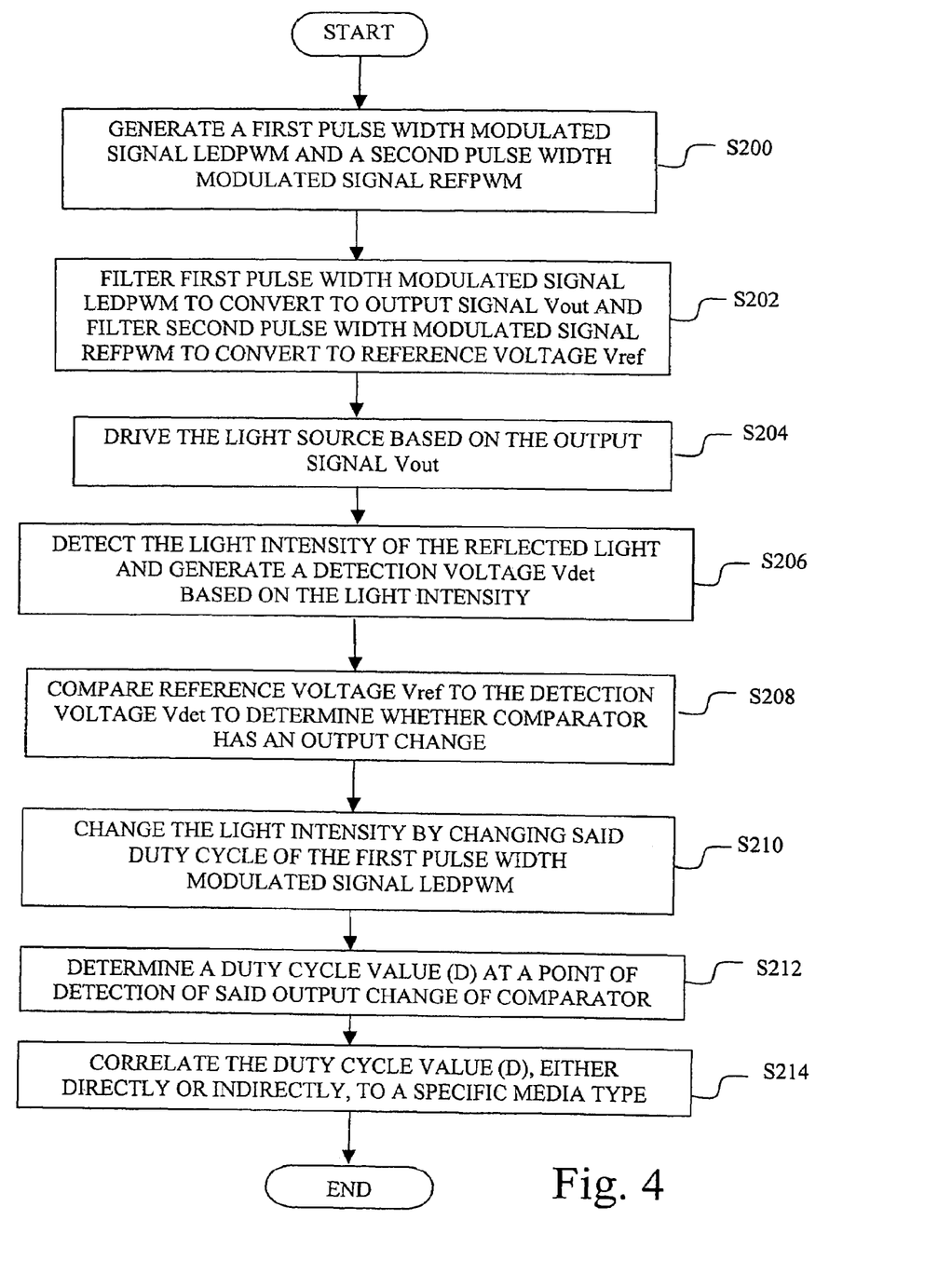
FIG. 4 depicts a flowchart of one media sensing method used in implementing the present invention.

FIG. 4 depicts a flowchart of one media sensing method used in implementing the present invention, which will be described with reference to the circuit diagram of FIG. 3.

During operation of electrical circuit 110, at step S200, controller 18 generates a first pulse width modulated signal LEDPWM and a second pulse width modulated signal REFPWM. Each of the first pulse width modulated signal LEDPWM and the second first pulse width modulated signal REFPWM have a respective adjustable duty cycle.

At step S202, first low pass filter circuit 118 converts the first pulse width modulated signal LEDPWM to an output signal Vout having a voltage level related to the duty cycle of the first pulse width modulated signal LEDPWM. Likewise, second low pass filter circuit 120 converts the second pulse width modulated signal REFPWM to a reference voltage Vref having a voltage level related to the duty cycle of the second pulse width modulated signal REFPWM.

At step S204, output signal Vout is supplied to drive media sensor drive circuit 116. Media sensor drive circuit 116 is configured such that the voltage level of output signal Vout controls the current passing through light source 122, thereby in essence driving light source 122 based on output signal Vout. In turn, light source 122 generates a light beam that impinges print media sheet 23 thereby generating reflected light. The reflected light has a light intensity that is related to the voltage level of output signal Vout and is related to a type of print media sheet 23, e.g., plain paper, photo paper, coated paper, transparency, etc.

At step S206, light detector 124 detects the light intensity of the reflected light, and generates a detection voltage Vdet based on the light intensity.

At step S208, comparator U2A receives at its inverting input port (−) the reference voltage Vref, and receives at its non-inverting input port (+) detection voltage Vdet. Since comparator U2A is configured as a comparator circuit 114, comparator U2A compares the reference voltage Vref to the detection voltage Vdet. Comparator U2A has an output change from an initial output state, e.g., a digital low state (0) to a media detection state, e.g., a digital high state (1) when the detection voltage Vdet transitions across the reference voltage Vref. In circuit 110 as configured in FIG. 3, the transition across the reference voltage Vref is when the detection voltage Vdet exceeds reference voltage Vref, wherein for example the positive feedback arrangement of comparator circuit 114 amplifies even a slight voltage difference between detection voltage Vdet and reference voltage Vref to cause the output of comparator circuit 114 to switch from a digital low state (0) to a digital high state (1). It is to be understood, however, that if alternatively comparator U2A received at its inverting input port (−) the detection voltage Vdet and received at its non-inverting input port (+) the reference voltage Vref, then the transition across the reference voltage Vref is when the detection voltage Vdet exceeds reference voltage Vref, wherein for example, the positive feedback arrangement of comparator circuit 114 amplifies even a slight voltage difference between detection voltage Vdet and reference voltage Vref to cause the output of comparator circuit 114 to switch from a digital high state (1) to a digital low state (0).

During media sensing, for example, controller 18 provides the first pulse width modulated signal LEDPWM with a low duty cycle, e.g., 0.5 percent, resulting in a detection voltage Vdet that has not yet transitioned across the reference voltage Vref. At step S210, controller 18 then changes, e.g., increases, the light intensity of light source 122 by changing the duty cycle of the first pulse width modulated signal LEDPWM that effectively drives light source 122, while monitoring for said output change of comparator U2A.

At step S212, controller 18 then determines the duty cycle value (D) for the first pulse width modulated signal LEDPWM at a point of detection of said output change, e.g., a change from a digital low state (0) to a digital high state (1) at comparator U2A.

At step S214, controller 18 then correlates the duty cycle value (D), either directly or indirectly, to a specific media type.

For example, duty cycle value (D) may be indirectly correlated to a particular media type by first forming a ratio of duty cycle value (D) with the duty cycle (D0) of pulse width modulated signal LEDPWM associated with a known media, e.g., a calibration media. The use of a coated media as the calibration media results in a calibration to a low glossy media. Thus, controller 18 can calculate a ratio D0/D, and then correlate the ratio D0/D to a specific media type. Alternatively, the ratio could be D/D0.

To enhance the operation of the media sensing method of the invention, correction can be made to compensate for such variables as the differences between media sensor operation characteristics within a received lot of media sensors, including for example, Media Sensor 1 and Media Sensor 2, each of which could be used as media sensor 80. Table 1, below, is a comparison of exemplary data values associated with each of Media Sensor 1 and Media Sensor 2, wherein Media Sensor 1 is considered a "good" sensor and Media Sensor 2 is a "weak" sensor. Through the compensation method, described below, Media Sensor 2 will be made to be effectively a "good" sensor.

TABLE 1

Exemplary values associated with each of Media Sensor 1 and Media Sensor 2 for various media types.

| Print Media Type | Sensor 1 D | Sensor 1 D0/D | Sensor 2 D | Sensor 2 D0/D |
|---|---|---|---|---|
| Calibration Media (coated) | 45.50 | 1.00 | 72.00 | 1.00 |
| Coated Paper I | 36.75 | 1.24 | 60.18 | 1.20 |
| Plain Paper I | 29.25 | 1.56 | 48.30 | 1.49 |
| Plain Paper II | 25.67 | 1.77 | 42.44 | 1.70 |
| Photo Paper I | 10.25 | 4.44 | 18.54 | 3.88 |
| Photo Paper II | 6.58 | 6.91 | 12.16 | 5.92 |
| Photo Paper III | 6.50 | 7.00 | 12.09 | 5.96 |
| Photo Paper IV | 6.92 | 6.58 | 12.96 | 5.56 |
| Transparency I | 4.42 | 10.29 | 7.81 | 9.22 |
| Transparency II | 3.92 | 11.61 | 7.59 | 9.49 |

Using the data from Table 1, media type determination criteria for media type determination can be established, for example, as follows in Table 2.

TABLE 2

Media Type Determination

| Media Type Determination Criteria | Print Media Type |
|---|---|
| D0/D < 1.4 | Coated Paper |
| 1.4 ≦ D0/D < 2.5 | Plain Paper |
| 2.5 ≦ D0/D < 9.0 | Photo Paper |
| 9.0 ≦ D0/D | Transparency |

Referring again to Table 1, as between Media Sensor 1 and Media Sensor 2, there can be significant variations in the normalized ratios D0/D among various media sensors for certain media due to variations in optical components and arrangements. For example, the print media Photo Paper III can have normalized ratios from 6.0 to 7.0, depending on the characteristics of the particular media sensor used. This variation can be removed by using a correction factor CF, as in the equation that follows.

The correction factor CF is determined by the equation:

$$CF = K/[(D0/Dh)-1]$$

wherein:

D0 is the duty cycle of the pulse width modulated signal LEDPWM associated with media sensor 80 for low glossy calibration media, e.g., coated media;

Dh is the duty cycle of the pulse width modulated signal LEDPWM associated with media sensor 80 for high glossy calibration media, e.g., transparency; and K is the average of [(D0/Dh)−1] measured for multiple media sensors, e.g., ten media sensors.

A high glossy calibration media may be, for example, a transparency.

Any normalized ratio (D0/D) for media sensor 80 will then be corrected by the equation:

$$\text{Corrected Normalized Ratio } (CRn) = [(D0/D)-1] \times CF + 1$$

FIGS. 5A–5D depict a flowchart of another media sensing method used in implementing the present invention. This method compensates for background light that can possibly leak into media sensor 80, and compensates for the turn on voltage of light source 122. For convenience, abbreviations are used in the flowchart of FIGS. 5A–5D, as follows:

DS=Duty Cycle of LEDPWM
DR=Duty Cycle of REFPWM
S1=LEDPWM Duty Cycle Step, e.g., 0.5%
S2=REFPWM Duty Cycle Step, e.g., 2%
F0=15%, REFPWM Duty Cycle for a One-half Volt Step at Vref
DR0=REFPWM Duty Cycle Equivalent to Background Light
DS0=LEDPWM Duty Cycle at which LED Turns ON At step S300, controller 18 switches light source 122, such as an LED, to an OFF state. In other words, the duty cycle DS of pulse width modulated signal LEDPWM is set to zero percent.

Figure 5A:
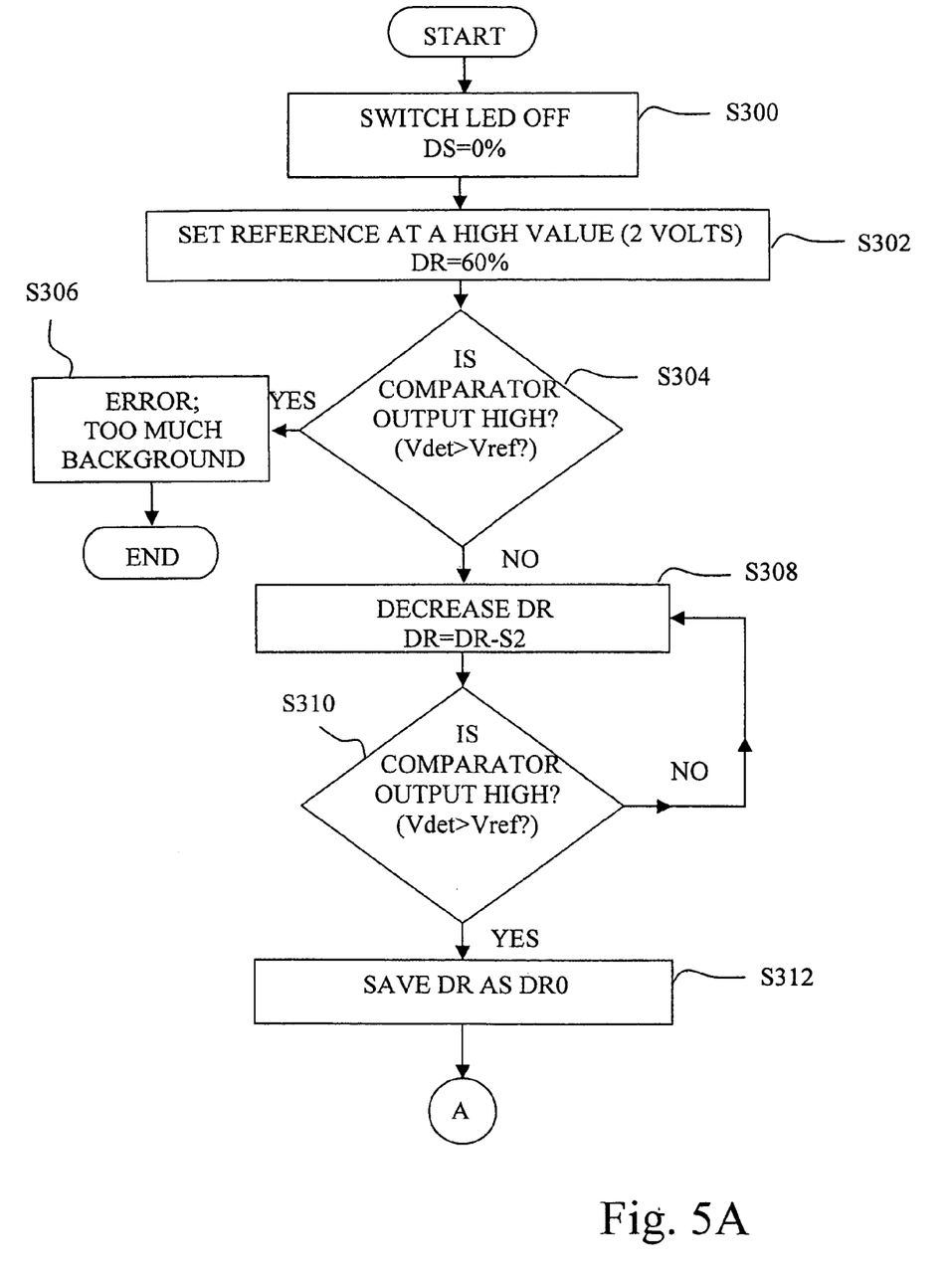
FIGS. 5A, 5B, 5C and 5D depict a flowchart of another media sensing method used in implementing the present invention.

At step S302, controller 18 sets the duty cycle of pulse width modulated signal REFPWM to 60 percent, which corresponds to a reference voltage Vref of 2.0 volts.

At step S304, controller 18 determines whether the output of comparator U2A is at a digital high state (1).

If the result at step S304 is YES, then at step S306 an error indication that the background light level is too high is provided at one of printer 10 and computer 8.

If the result at step S304 is NO, then the process proceeds to step S308.

At steps S308 and S310, controller 18 reduces the duty cycle DR of pulse width modulated signal REFPWM by an amount S2, which is equivalent to a REFPWM duty cycle step, e.g., two percent, and monitors the output of comparator U2A for an output change from a digital low state (0) to the digital high state (1) to determine the level of background light that is sensed by media sensor 80.

At step S312, controller 18 then saves the current duty cycle DR of pulse width modulated signal REFPWM as DR0, which represents the pulse width modulated duty cycle equivalent to the background light.

Figure 5B:
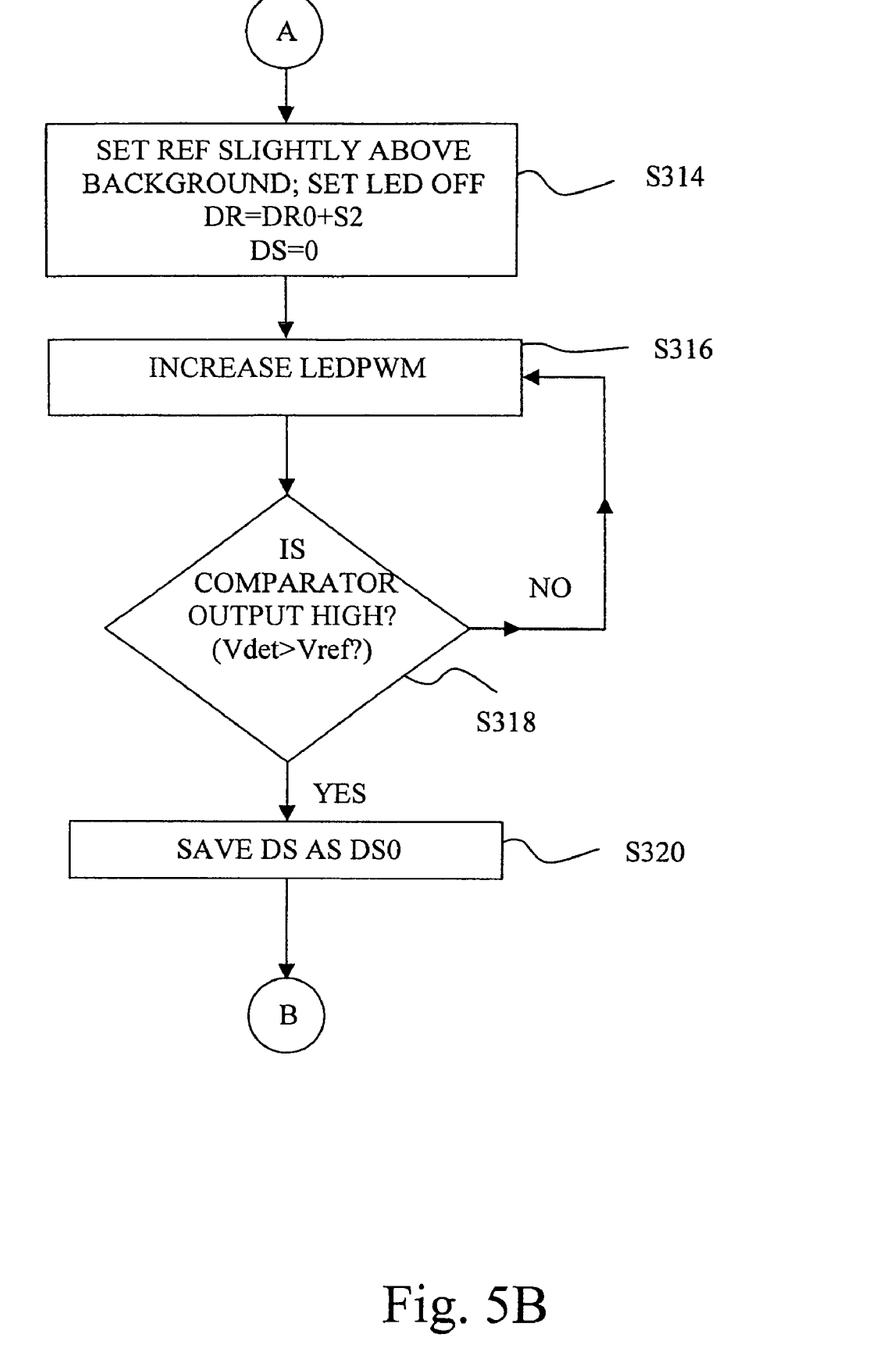

At step S314, controller 18 sets the duty cycle DR of pulse width modulated signal REFPWM slightly above that of DR0, such as by DR0+S2, which in turn is filtered and supplied as reference voltage Vref to the non-inverting port of comparator U2A, and the duty cycle DS of pulse width modulated signal LEDPWM is set to zero.

At steps S316 and S318, controller 18 increases the duty cycle DS of pulse width modulated signal LEDPWM, which results in a detection voltage Vdet signal being supplied to the non-inverting port of comparator U2A, and monitors the output of comparator U2A for an output change from a digital low state (0) to the digital high state (1), when the detection voltage Vdet signal is greater than the reference voltage Vref, so as to determine the duty cycle DS0 at which light source 122 turns ON.

When the result of step S318 is YES, then at step S320, controller 18 stores DS0.

At step S322, controller 18 sets the duty cycle DR of pulse width modulated signal REFPWM above that of DR0 in steps of F0 at the highest possible level such that DR=(DR0+n×F0)<100, wherein F0 is a 15 percent REFPWM duty cycle corresponding to a one-half volt step of reference voltage Vref, and n is the highest possible step number, e.g., n=6.

Figure 5C:
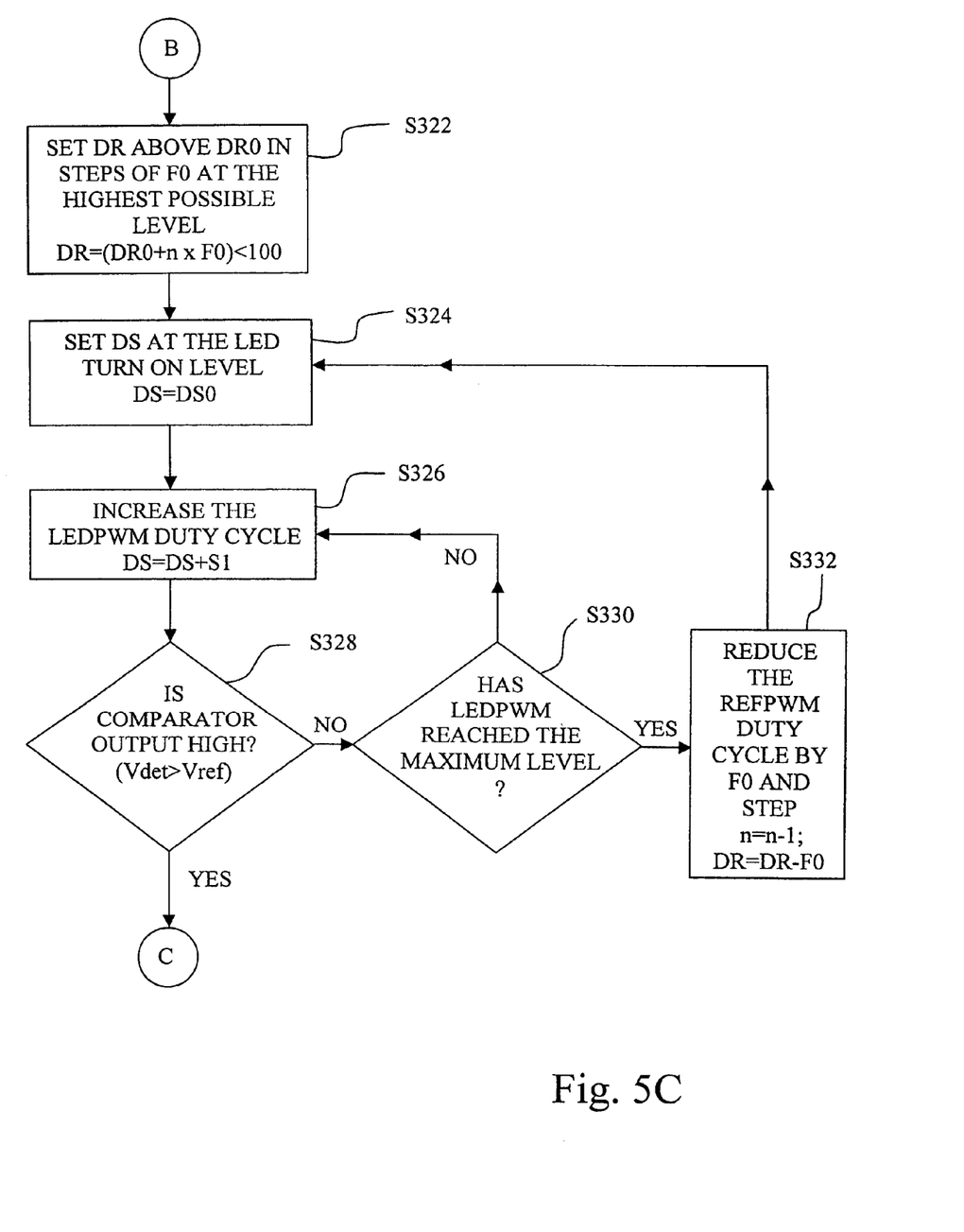

At step S324, the duty cycle DS of pulse width modulated signal LEDPWM is set at the turn on level of light source 122, i.e., DS=DS0.

At step S326, the duty cycle DS of pulse width modulated signal LEDPWM is increased by a duty cycle step, S1, and is stored as the new value DS, such that DS=DS+S1. S1 may be, for example, a one-half percent duty cycle increase.

At step S328, it is determined whether the output of comparator U2A has experienced a change in output state from low (0) to high (1); or, in other words, whether the detection voltage signal Vdet is greater than reference voltage Vref.

If at step S328 the determination is NO, the process proceeds to step S330, where it is determined whether pulse width modulated signal LEDPWM has reached its maximum level.

If at step S330, the determination is NO, then the process returns to step S326.

If at step S330 the determination is YES, the process proceeds to step S332 wherein the duty cycle DR of pulse width modulated signal REFPWM is reduced by F0 by reducing the step number n by one count, i.e., n=n−1, and DR=DR−F0. The process then returns to step S324.

If, however, at step S328 the determination was YES, then the process proceeds to step S334.

Figure 5D:
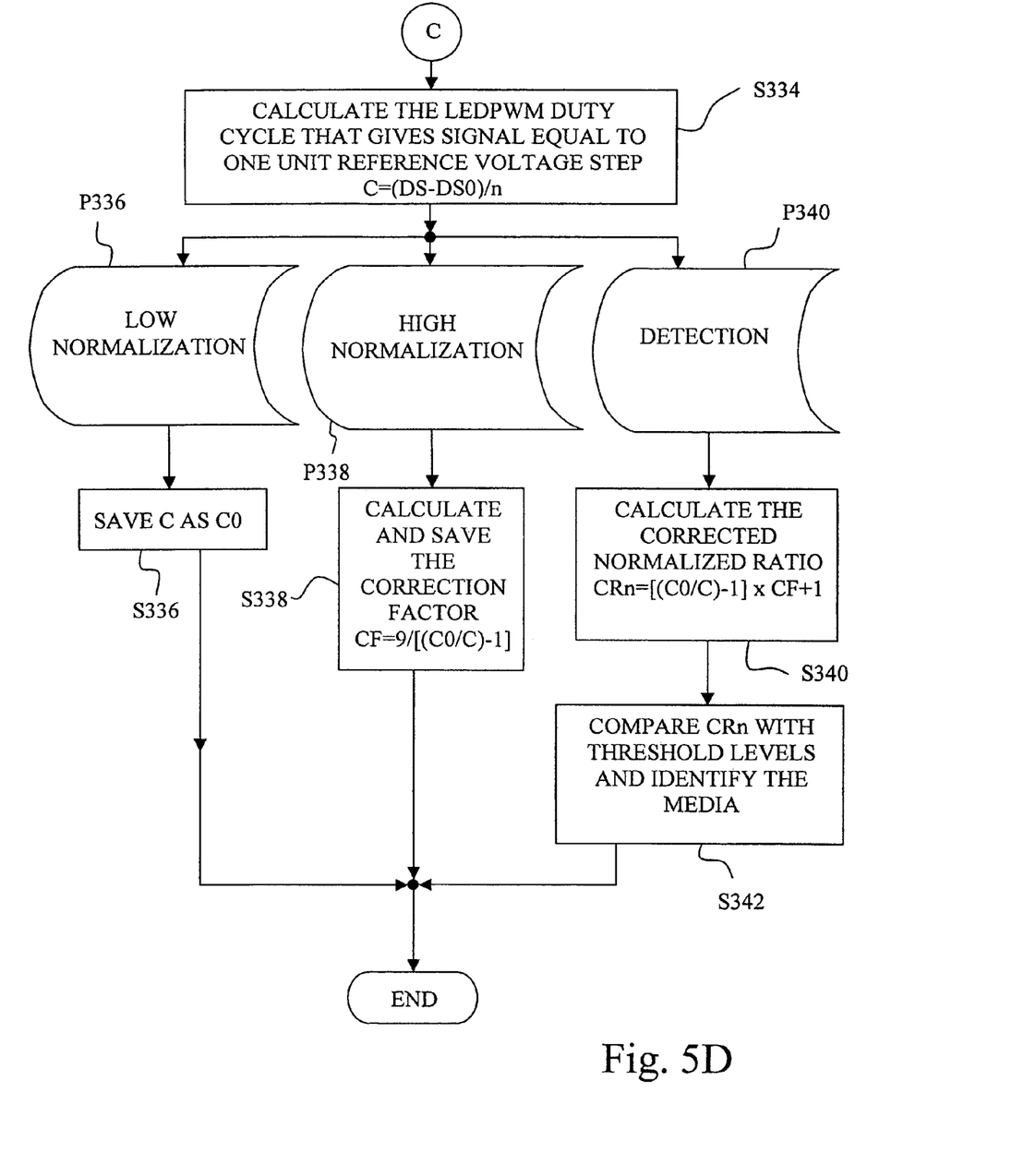

At step S334, a duty cycle C for pulse width modulated signal LEDPWM that gives a signal equal to one unit reference voltage step of reference voltage Vref is determined, wherein:

$$C = (DS - DS0)/n.$$

Thereafter, one of paths P336, P338 and P340, is performed depending on whether it is desired to set a low normalization value, to set a high normalization value, or to perform media detection, respectively.

For low normalization (path P336), e.g., normalization based on a low glossy calibration media, such as coated paper, at step S336, C is saved as C0.

For high normalization (path P338), e.g., normalization based on a high glossy calibration media, such as a transparency, at step S338, a correction factor CF is determined based on the equation:

$$CF=9/[(C0/C)-1]$$

wherein C is the duty cycle for pulse width modulated signal LEDPWM that gives a signal equal to one unit reference voltage step for a sensed sheet of calibration high glossy media.

For media detection (path P440), at step S340, a corrected normalized ratio CRn is determined by the equation:

$$CRn=[(C0/C)-1]\times CF+1,$$

wherein:

CRn is the corrected normalized duty cycle ratio of the unknown media;

C0 is a duty cycle of a first calibration media, e.g., a low glossy media, for a unit reference voltage step corresponding to the changing of the duty cycle DR;

CF is a correction factor based on a duty cycle of a second calibration media, e.g., a high glossy media, for the unit reference voltage step corresponding to the changing of the duty cycle DR; and C is a measured duty cycle of the unknown media for the unit reference voltage step corresponding to the changing of the duty cycle DR.

At step S342, corrected normalized ratio CRn is compared to the media sensing ranges, such as those depicted in Table 3 below.

TABLE 3

Media Type Determination

| Media Type Determination Criteria | Print Media Type |
|---|---|
| CRn < 1.4 | Coated Paper |
| 1.4 ≤ CRn < 2.5 | Plain Paper |
| 2.5 ≤ CRn < 9.0 | Photo Paper |
| 9.0 ≤ CRn | Transparency |

While this invention has been described with respect to various embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method of correcting for sensitivity variation of media sensors, comprising the steps of:

determining a first signal level corresponding to a first calibration media having a first glossiness;

determining a second signal level corresponding to a second calibration media having a second glossiness, said second glossiness being greater than said first glossiness; and determining a corrected normalized signal level ratio of an unknown media based on said first signal level of said first calibration media and said second signal level of said second calibration media.

2. A method of correcting for sensitivity variation of media sensors, comprising the steps of:

(a) determining a first duty cycle corresponding to a first calibration media having a first glossiness;

(b) determining a second duty cycle corresponding to a second calibration media having a second glossiness, said second glossiness being greater than said first glossiness; and (c) determining a corrected normalized duty cycle ratio of an unknown media based on said first duty cycle of said first calibration media and said second duty cycle of said second calibration media.

3. The method of claim 2, wherein said determining of said first duty cycle is performed by the further steps of:

providing a signal source generating a first pulse width modulated signal having a variable duty cycle;

converting said first pulse width modulated signal to an output signal having a voltage level related to said variable duty cycle;

providing a sensor including a light source and a light detector;

driving said light source based on said output signal, said light source generating a light beam that impinges said first calibration media thereby generating reflected light, said reflected light having a light intensity related to said voltage level and related to a type of said first calibration media;

detecting said light intensity of said reflected light with said light detector, said light detector generating a detection voltage based on said light intensity;

providing a comparator to compare a reference voltage to said detection voltage, wherein said comparator has an output change from an initial output state to a media type detection state when said detection voltage transitions across said reference voltage;

changing said light intensity of said light source by changing said variable duty cycle of said first pulse width modulated signal, while monitoring for said output change of said comparator; and determining said first duty cycle value as a value of said variable duty cycle at a point of detection of said output change.

4. The method of claim 2, wherein said determining of said second duty cycle is performed by the further steps of:

providing a signal source generating a first pulse width modulated signal having a variable duty cycle;

converting said first pulse width modulated signal to an output signal having a voltage level related to said variable duty cycle;

providing a sensor including a light source and a light detector;

driving said light source based on said output signal, said light source generating a light beam that impinges said second calibration media thereby generating reflected light, said reflected light having a light intensity related to said voltage level and related to a type of said second calibration media;

detecting said light intensity of said reflected light with said light detector, said light detector generating a detection voltage based on said light intensity;

providing a comparator to compare a reference voltage to said detection voltage, wherein said comparator has an output change from an initial output state to a media type detection state when said detection voltage transitions across said reference voltage;

changing said light intensity of said light source by changing said variable duty cycle of said first pulse width modulated signal, while monitoring for said output change of said comparator; and determining said second duty cycle value as a value of said variable duty cycle at a point of detection of said output change.

5. The method of claim 2, wherein step (c) is performed using the equation:

$$CRn = [(D0/D) - 1] \times CF + 1$$

wherein:
CRn is said corrected said normalized duty cycle ratio of said unknown media;
D0 is said first duty cycle of said first calibration media;
CF is a correction factor based on said second duty cycle of said second calibration media; and
D is a measured duty cycle of said unknown media.

* * * * *